(12) United States Patent
Mokhtari et al.

(10) Patent No.: US 10,491,000 B2
(45) Date of Patent: Nov. 26, 2019

(54) SYSTEMS AND METHODS FOR UTILIZATION OF DEMAND SIDE ASSETS FOR PROVISION OF GRID SERVICES

(71) Applicant: Open Access Technology International, Inc., Minneapolis, MN (US)

(72) Inventors: Sasan Mokhtari, Eden Prairie, MN (US); Khashayar Nodehi Fard Haghighi, Maple Grove, MN (US); Abdolhossein aka Farrokh Rahimi, Los Altos, CA (US); Ali Ipakchi, San Carlos, CA (US); Farrokh Albuyeh, San Carlos, CA (US); David Heim, Minneapolis, MN (US)

(73) Assignee: Open Access Technology International, Inc., Minneapolis, MN (US)

( * ) Notice: Subject to any disclaimer, the term of this patent is extended or adjusted under 35 U.S.C. 154(b) by 475 days.

(21) Appl. No.: 15/042,762

(22) Filed: Feb. 12, 2016

(65) Prior Publication Data

US 2016/0239006 A1  Aug. 18, 2016

Related U.S. Application Data

(60) Provisional application No. 62/115,483, filed on Feb. 12, 2015.

(51) Int. Cl.
*H02J 3/14* (2006.01)

(52) U.S. Cl.
CPC ............. *H02J 3/14* (2013.01); *Y02B 70/3225* (2013.01); *Y04S 20/222* (2013.01)

(58) Field of Classification Search
CPC ..... H02J 3/14; H02J 2003/007; Y04S 20/222; Y04S 10/54; Y04S 40/22; Y04S 10/40; Y04S 50/10; G08B 25/10; G08B 25/009; G01R 21/133; Y02B 70/3225
USPC ............................................. 700/295; 705/34
See application file for complete search history.

(56) References Cited

U.S. PATENT DOCUMENTS

| | | | | |
|---|---|---|---|---|
| 2008/0272934 | A1* | 11/2008 | Wang ....................... | H02J 3/14 340/870.11 |
| 2015/0364919 | A1* | 12/2015 | Schumer ................... | H02J 3/14 700/291 |

OTHER PUBLICATIONS

IEEE Guide for Smart Grid Interoperability of Energy Technology and Information Technology Operation with the Electric Power System (EPS), End-Use Applications, and Loads, IEEE, Sep. 10, 2011.*

(Continued)

*Primary Examiner* — David Lam
(74) *Attorney, Agent, or Firm* — Vidas Arrett & Steinkraus P.A.

(57) ABSTRACT

Systems and methods are provided, which facilitate operations planning, dispatch, regulation control, and autonomous control performance. The disclosure also facilitates systems and methods for utilization of synthetic primary frequency response, synthetic inertia, regulation and load following/ramping reserve capabilities from Demand Response and Distributed Energy Resources for balancing demand and supply and maintaining frequency levels across a power grid.

4 Claims, 1 Drawing Sheet

(56) References Cited

OTHER PUBLICATIONS

IEEE Guide for Smart Grid Interoperability of Energy Technology and Information Technology Operation with the Electric Power System (EPS), End-Use Applications, and Loads (IEEE 2030-2011) (Year: 2011).*

* cited by examiner

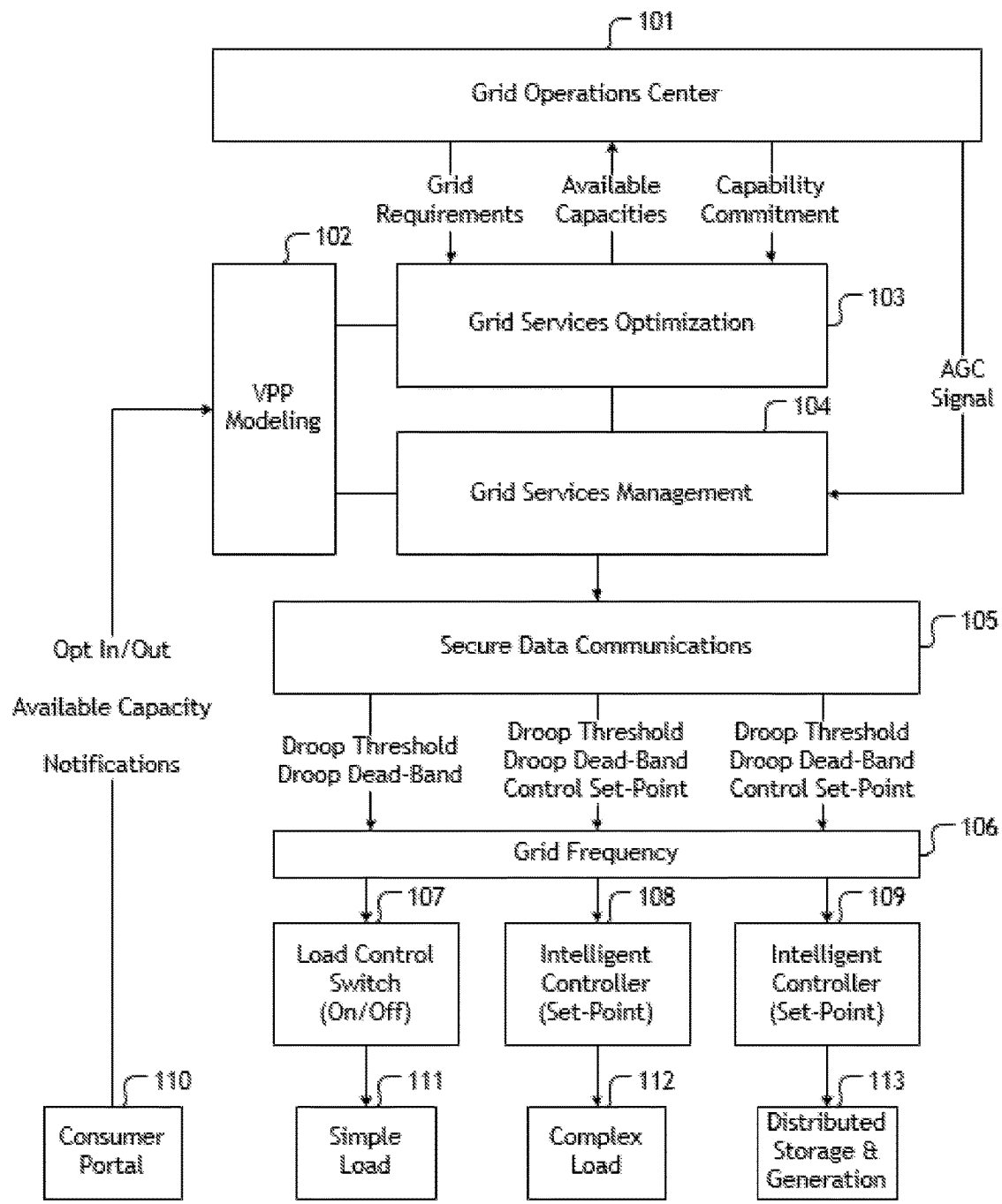

SYSTEMS AND METHODS FOR UTILIZATION OF DEMAND SIDE ASSETS FOR PROVISION OF GRID SERVICES

CROSS-REFERENCE TO RELATED APPLICATIONS

This application claims priority to U.S. Provisional patent application No. 62/115,483 filed Feb. 12, 2015, the entire content of which is hereby incorporated by reference.

STATEMENT REGARDING FEDERALLY SPONSORED RESEARCH

Not Applicable.

FIELD OF THE INVENTION

The present disclosure relates generally to electric power and, more particularly, to synthetic primary frequency response, synthetic inertia, regulation and load following/ramping reserve capabilities from Demand Response and Distributed Energy Resources.

BACKGROUND OF THE INVENTION

Electric utilities use a variety of tools to balance demand and supply and maintain frequency levels across the grid. To accomplish this task, they rely on provision of grid services from generation resources. The grid services include primary frequency control (usually provided through generation droop and natural frequency response of system load), secondary frequency control (also known as regulation or Automatic Generation Control (AGC)), and tertiary control (usually accomplished through economic dispatch). These different control categories are distinguished primarily by the required response characteristics of the underlying grid services. Primary frequency control is the fastest; it is initiated almost instantaneously in response to frequency changes. Regulation is next in time sequence; it is initiated by set points (or raise/lower signals) generated by AGC system, usually every few seconds. Tertiary control or economic dispatch is next in line; it is initiated usually every 5 minutes and generates base points (dispatch targets for load following and ramping operations). Generally, preceding these time frames, there is an operations planning stage where generation resources needed to provide these grid services are committed and scheduled to meet the anticipated operational requirements of each time frame.

The task of providing these grid services and planning for their provision while accounting for their interactions has been complicated by the proliferation of variable renewable generation technologies.

The proliferation of variable renewable generation technology available in current market systems create imbalanced variability and frequency deviations that are increasingly difficult to respond to. As a consequence, increasing the quality of frequency response, regulation, and balancing services is a motivating factor for market participants and important for efficient operation of overall electricity markets.

With the proliferation of variable generation utilities, Balancing Areas can no longer rely only on conventional generation sources and traditional methods to reliably and economically secure and deploy grid services. Moreover, proliferation of some types of renewable generation such as photovoltaic (PV) resources has resulted in reduced system inertia, further complicating the effectiveness of such traditional methods of utilizing grid services.

BRIEF SUMMARY OF THE INVENTION

With the proliferation of variable generation utilities, Balancing Areas can no longer rely on conventional generation sources and traditional methods to reliably and economically secure and deploy grid services. The effectiveness of such traditional methods of utilizing grid services is further complicated by the growth in presence of some types of renewable generation that reduce system inertia, such as photovoltaic (PV) resources.

The invented systems and methods leverage market operation experiences and utilize advances in information technology, optimization techniques, computation capabilities, and man-machine interaction. In some embodiments, the disclosure may support further evolution of electricity market policy, design, and deployment in a variety of market operation settings.

The architecture of the disclosed system and methodology to provide primary frequency response, synthetic inertia, regulation and ramping reserve capabilities from Demand Response and Distributed Energy Resources can be applied across various technology utilizing such technology's functionality to accomplish the operations disclosed herein in order to carry out said operations as necessary to achieve the desired outcome.

Using demand side (DR-DER) capabilities to provide synthetic frequency response, and synthetic inertia is the key to a cost effective solution. The set up envisioned as part of this invention for provision of these synthetic products, also enables utilities to provide other grid services including regulation and load following/ramping from demand-side assets.

To this end, the demand-side assets can broadly be categorized into three categories, namely, simple loads that can simply be switched on and off, complex loads such as building loads usually managed by local intelligent controllers, and bi-directional assets such as storage devices that are also generally managed by their associated local intelligent controls.

Using the technology set forth in this invention, the first category (simple loads) can be leveraged to provide synthetic frequency response and inertia, whereas the other two categories can provide all of the stated services.

The invention also expands the range of DR-DER programs that utilities can offer to the consumers for the mutual benefit of the consumers and the utility. The utilities can manage settings on customer equipment enrolled in such programs. In addition to turning off or adjusting customer equipment in order to shed load, electric utilities may request customers enrolled in a plan to generate electricity to supplement the electricity on the electric grid via distributed energy resources (DER).

The details of one or more aspects of the disclosure are set forth in the accompanying drawings and the description below. Other features, objects, and advantages will be apparent from the description, drawings and mathematical formulations that are summarized in the claims.

BRIEF DESCRIPTION OF DRAWINGS

FIG. 1 is a diagram illustrating the designed system operation and the technology utilized in the designed system.

DETAILED DESCRIPTION OF THE INVENTION

While this invention may be embodied in many forms, there are specific embodiments of the invention described in detail herein. This description is an exemplification of the principles of the invention and is not intended to limit the invention to the particular embodiments illustrated.

In general, this disclosure is directed toward operations planning, dispatch, regulation control, and autonomous control performance. Performance of these controls improves the quality of frequency response, regulation, and balancing services.

Prior to the start of the operation planning, the utility would have created the underlying DR-DER programs and the customers and their assets would have registered for such various programs as offered by the utility. In some embodiments, these may include DR-DER programs with initial incentive payments to the utility customers ($/kW enrolled assets), pay for performance provisions ($/KW/hr of availability and/or $/kWh energy production or load reduction), as well as any other program devised and offered by a utility.

Operations Planning/Scheduling:

The Operations Planning Time Horizon spans many hours, in preferred embodiments, until the end of the next day with hourly time resolution. The Distributed Energy Management System (DERMS) performs VPP Modeling 102 by creating Virtual Power Plants (VPPs) capable of providing various grid services. In some embodiments, VPP Modeling may use customer/asset enrollment information and asset models, along with influencing factors such as weather forecast, time of day usage patterns, etc., and any opt out declarations from the enrolled consumers as obtained through a Consumer Portal 110. For each VPP and each time interval increment in the operations planning time horizon, the DERMS 102 provides the total available capacity as well as VPP capability for provision of each grid service. Since the same portion of the capacity may be able to provide more than one service, the task of allocating portions of each VPP capacity to a specific service can be performed by Grid Service Optimization 103 considering a variety of other operational and economic factors.

Using the VPP data provided by DERMS 102, the Grid Service Optimization 103 interacts with the Grid Operations Center 101 multiple times. The first interaction involves communication from a Grid Operations Center 101 to Grid service Optimization 103 regarding the levels of Grid Services needed from DR-DER assets. The Grid Service Optimization 103 uses VPP information provided by DERMS 102 including any economic information collected from various market and customer portal interfaces to allocate available VPP capacities for provision of different grid services. The available capacities (and in some embodiments, any associated VPP costs) are communicated to the Grid Operations Center 101. If VPP costs are communicated, the Grid Operations Center 101 may use its own operations planning/scheduling function and revise the allocation of Grid Services to DR-DER. In either case, the Grid Operations Center 101 communicates the Capability Commitment for various grid services to the Grid Services Optimization 103.

Upon receipt of the Capability Commitments from the Grid Operations Center 101, the Grid Service Optimization 103 performs several tasks. In some embodiments, these can include repartition of Capability Commitments received from Grid Control Center 101 among different VPPs based on a combination of VPP technical parameters and costs from the DERS 102. In some embodiments, this could also include determination of droop characteristics needed from VPPs repressing simple loads 111 (including Dead-Band and hysteresis) for provision of primary frequency response. In some embodiments, tasks can also include repartition of VPP capacities from Complex Loads 112 and Distributed Storage and Generation 113 for provision of primary frequency response, regulation and ramping/load following. In embodiments where requests for grid services from the Grid Operations Center 101 also include assistance from DR-DER for provision of synthetic inertia, that requirement is incorporated in Grid Services Optimization 103 through inclusion of the rate of change of VPP outputs with respect to the rate of change of frequency while constructing the primary frequency response characteristics.

The required grid services from each VPP for each time interval (unit) determined by Grid Services Optimization 103 is communicated to the Grid Services Management 104.

The Grid Services Management 104 allocates the grid services assigned to each VPP by the Grid Service Optimization 103 to individual Load Control Switches 107, and Intelligent Controllers 108 and 109 using Secure Data Communications channels 105. In some embodiments, this can include thresholds for connect/disconnect in response to grid frequency 106, and where needed the rate of change of frequency (for synthetic inertia), as well as the trigger points that will be used in actual operation in response to control set points.

In sum, the operations planning/ scheduling outputs thresholds to simple load switches 111, as well as thresholds and trigger set-points downloaded to switches and local controllers, for Complex Loads 112 and Distributed Storage & Generation 113.

Near Real-time Operation (Tertiary Control):

The main objective of near-real time or tertiary control is to use dispatchable resources in clouding conventional generation and VPPs to meet the load following/ramping needs on the Grid Operation Center 101. An implicit secondary objective is to reduce the imbalances that would otherwise have to be compensated by securing more regulation service with consequent cost increase and possible system performance degradation.

To achieve the optimum mix of dispatch targets for conventional generation and VPPs, the Grid Services Optimization 103 interacts with the Grid Operations Center 101, in preferred embodiments with a dispatch time horizon of one or more hours with 5 minute time resolution although other horizons may also be utilized to achieve specific controls or results.

The result of the Tertiary Control are dispatch base point for generating units and VPPs for each of the future time intervals in the dispatch time horizon. Generally only the results of the first interval are used to control the output of generating units and VPPs since, in preferred embodiments, Tertiary Control is performed every 5 minutes to update the base points for subsequent time intervals.

The outputs of tertiary control process are used by the Grid Operations Center 101 and Grid Service Management 104. The base points for conventional generation are used directly by the Grid Operation Center 101 AGC function. The base points for VPPs comprised of Simple Loads 111, Complex Loads 112 and Distributed Storage and Generation 113 are used by the Grid Service Management 104. However, those are also communicated to Grid Control Center 101 for subsequent coordination of secondary controls.

The VPP tertiary control signals are communicated to load controls 107, 108, and 109 using the Secure Data Communication channels 105.

Secondary Control

Secondary control involves provision of regulation from both conventional generation under AGC and the VPPs capable of and scheduled for providing the regulation service. The regulation (AGC) signals are generated at the Grid Operations Center 101. AGC signals for VPPs are communicated to the Grid Services Management 104, which, depending on the AGC design, may either pass the signal through as percentages raise/lower, or disaggregate the VPP secondary control set points among constituent Intelligent Controllers 108 and 109 for Complex Loads 112 and Distributed Storage and Generation 113 capable of providing regulation.

Primary Control (Autonomous Frequency Response)

Autonomous/primary control that has traditionally been carried out by conventional generation through their governor control and primary frequency response settings, can now also be done (using this invention) in response to Grid Frequency changes 106 by primary frequency response in 111, 112, and 113.

If synthetic inertia is also required the frequency thresholds in controls 107, 108, and 109 can also be supplemented with thresholds for response to the rate of change of frequency.

The invention claimed is:

1. A method for regulating the electrical grids and grid-connected devices comprising the following steps:
   providing a grid operations center server, having a memory containing instructions which, when executed by a processor cause the processor to:
   determine the levels of grid services needed from available demand response and distributed energy resources (DR-DER) assets for each time interval increment in the operations planning time horizon;
   determine the available capacities and virtual power plant (VPP) costs for each time interval increment;
   send a determined capability commitment for grid services to a grid services optimization processor for each time interval increment;
   the grid services optimization processor configured to determine the required grid services from each VPP for each time interval;
   a grid services management server allocates the grid services assigned to each VPP to individual load control switches and intelligent controllers using secure data communications channels, so that thresholds are output to simple load switches, and thresholds and trigger set-points are downloaded to switches and local controllers for complex loads and distributed storage and generation.

2. The method of claim 1 further wherein a tertiary control processor outputs dispatch base points for generating units and VPPs for each time interval.

3. The method of claim 1 further wherein a secondary control processor provides regulation from both conventional generation under AGC and from VPPs capable of and scheduled for providing regulation services.

4. The method of claim 1 further wherein a primary control processor provides autonomous frequency response in response to grid frequency changes from simple loads, complex loads and distributed storage and generation.

* * * * *